March 19, 1957    J. A. NORTHCOTE ET AL    2,785,619
ADJUSTABLE STABILIZING DISK MOUNTING
Filed June 11, 1953      2 Sheets-Sheet 2
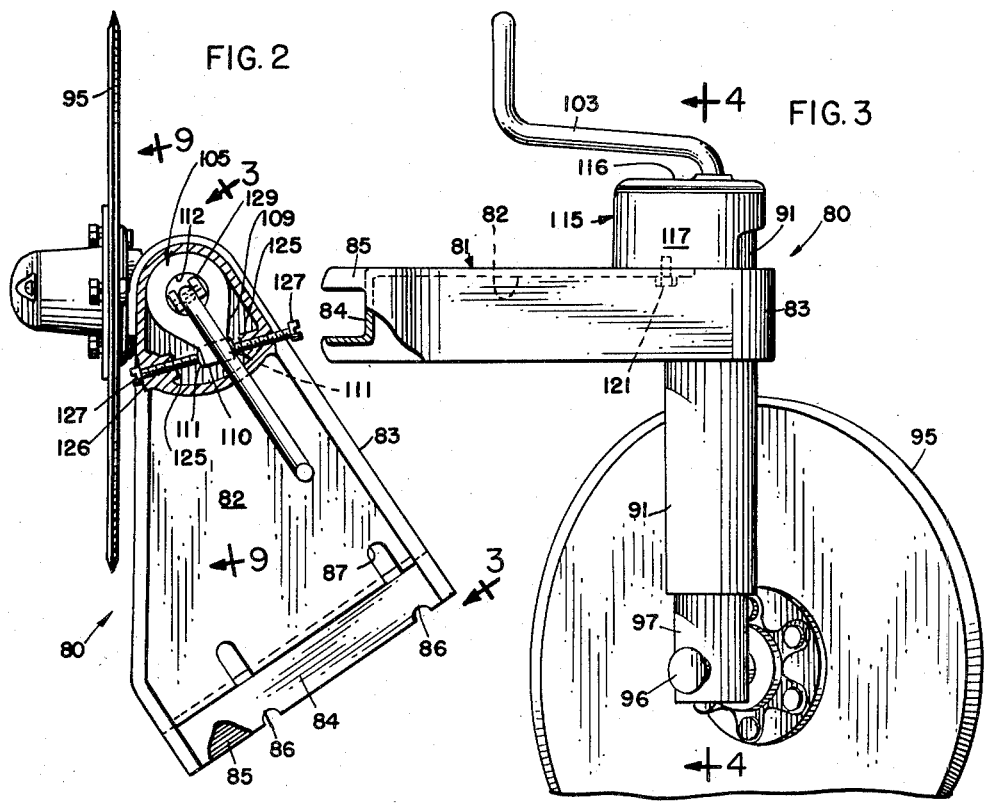
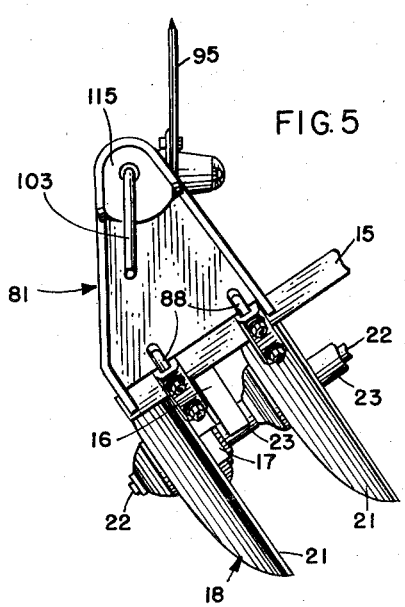
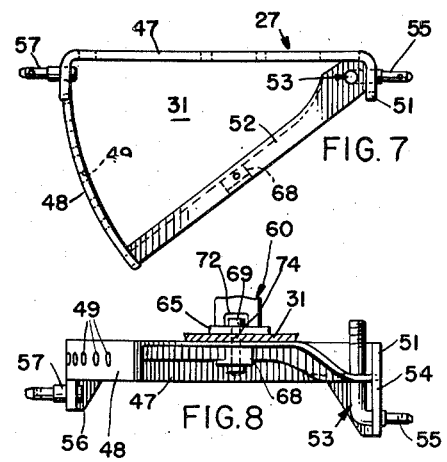
INVENTORS.
JOHN A. NORTHCOTE
KENNETH L. KIRKPATRICK
ATT'YS

United States Patent Office 2,785,619
Patented Mar. 19, 1957

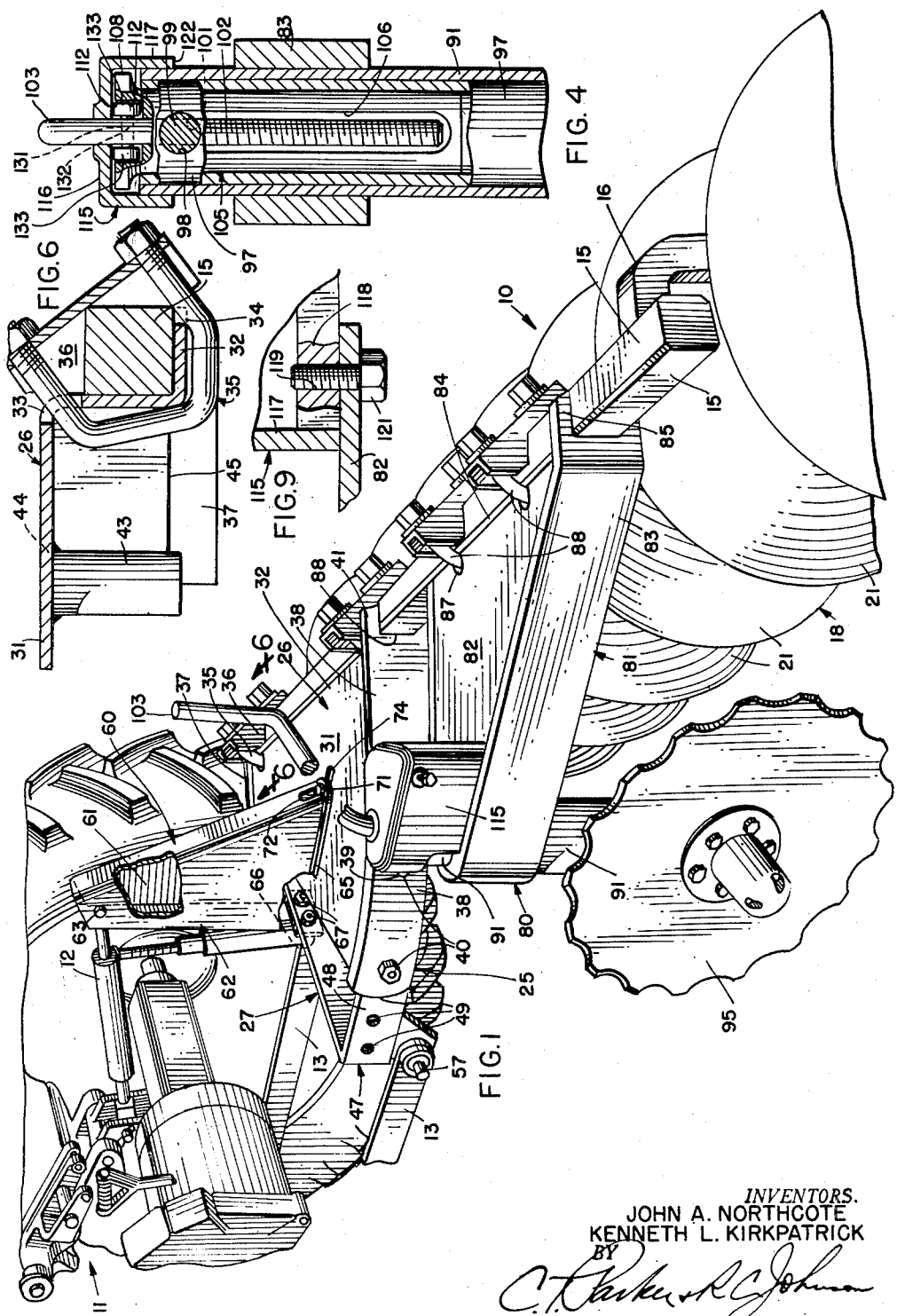

2,785,619

ADJUSTABLE STABILIZING DISK MOUNTING

John A. Northcote and Kenneth L. Kirkpatrick, Welland, Ontario, Canada, assignors to John Deere Plow Company (Limited), Welland, Ontario, Canada, a corporation of Canada Application June 11, 1953, Serial No. 360,952

6 Claims. (Cl. 97—209)

The present invention relates generally to agricultural implements and more particularly to soil-working implements, such as disk tillers and the like, in which the soil-working disks occupy a position making an angle to the line of forward travel, whereby the pressure of soil against the disks creates a side thrust that must be sustained in some way so that the implement may be held in the proper position.

The object and general nature of the present invention is the provision of new and improved means, preferably in the form of a colter attachment, for sustaining the aforesaid side thrusts and holding the implement to its work. More particularly, it is a feature of this invention to provide a new and improved colter attachment in which the colter disk is made adjustable, both as to the position of the colter in a vertical generally fore-and-aft extending plane relative to the remainder of the implement, and also as to the vertical position of the colter in the colter attachment frame, whereby the implement may successfully be operated under various soil conditions. Further, it is a feature of this invention to provide easily and conveniently made adjustments for changing the position of the side-thrust-resisting colter in accordance with or to compensate for changes in the working angle of the disk tools so as to have the implement trail properly and thereby impose no appreciable side loads on the tractor that propels the implement.

Another feature of this invention is the provision of a new and improved agricultural implement in the form of a tractor-mounted disk tiller or the like, particularly adapted for use with tractors having what is commonly termed a three-point linkage system, with new and improved means to change and/or adjust the position of the working elements so as to accommodate a variety of tractor treads and a variety of different operating conditions, particularly with respect to the action of the tools in either throwing the soil up toward the vines or trees, in the case of orchard and vineyard work, or pulling the soil away from the vines or trees, as desired.

Still further, another feature of the present invention is the provision of a new and improved colter attachment, which may optionally be arranged so that the side-thrust-resisting colter may be disposed in such position to readily accommodate work close to the vines, trees or the like, without appreciable damage to either the trees, vines and the like or their roots.

These and other objects and advantages of the present invention will be apparent to those skilled in the art after a consideration of the following detailed description, taken in conjunction with the accompanying drawings, in which:

Figure 1 is a perspective view of a tractor-mounted disk tiller in which the principles of the present invention have been incorporated.

Figure 2 is a fragmentary plan view, with parts shown in section, showing certain details of the colter mounting and adjustments therefor.

Figure 3 is a side view taken generally along the line 3—3 of Figure 2.

Figure 4 is a sectional view taken along the line 4—4 of Figure 3.

Figure 5 is a fragmentary plan view showing the colter frame in the different positions, with the colter turned 180° with respect to its position as shown in Figure 1.

Figure 6 is a sectional view taken generally along the line 6—6 of Figure 1.

Figure 7 is a detail plan view of the draft link-receiving part of the hitch frame structure.

Figure 8 is a side or end view of the hitch frame part shown in Figure 7.

Figure 9 is a sectional view taken generally along the line 9—9 of Figure 2 showing the manner in which the colter cap is attached to the colter frame.

Referring to the accompanying drawings, the reference numeral 10 indicates in its entirety a soil-working implement in the form of a pick-up disk tiller adapted to be mounted on a tractor 11 of the type having a three-point hitch linkage, including an upper link 12 and a pair of lower links 13. These links are connected with the tractor for both lateral and vertical swinging movement, and the rear ends of the links 12 and 13 have ball connectors or the like connecting the links with the implement 10, also for both lateral and vertical movement relative thereto.

The disk tiller 10 includes a generally diagonally extending frame bar 15, preferably square in cross section, and to each end portion of the bar 15 is secured rearwardly and downwardly extending bracket members 16. To the lower end of each bracket 16 is connected a bearing structure 17 that supports the adjacent end of the associated disk gang 18. The latter is made up of a plurality of soil-working disks 21, a gang bolt 22 and suitable spacing spools 23. The disks and gang bolt are rigidly interconnected to form a unit and are rotatably supported in the bearings 17.

Secured to the frame bar 15 is a hitch frame structure 25, providing for connection of the implement 10 to the hitch links 12 and 13 of the tractor. The hitch frame 25 includes a pair of relatively adjustable members 26 and 27, one being connected directly to the frame bar 15 and the other carrying means to receive the ball connectors or other means at the ends of the upper and lower hitch links 12 and 13.

As best shown in Figure 1, the hitch member 26 receiving the disk tiller frame bar 15 comprises a generally triangular plate 31 having a downwardly and rearwardly extended angular section 32 (Fig. 6) shaped to receive and fit snugly against the forward and lower side of the frame bar 15. This portion of the plate 31 is provided with apertures 33 and notches 34 to receive clamping U-bolts 35 having clamp caps 36, by which the member 26 may be securely fixed to the frame bar 15. Further, by loosening the clamping bolts 35, the entire hitch frame unit 25 may be shifted along the bar 15 to different positions, whereby the disks 21 may be brought into their proper position, laterally of the tractor, for the desired operation. The member 26 also includes end bars 37 and 38 securely fixed, as by welding, to the side edges of the plate 31. The left-hand bar 38 is arcuate and is provided with a pair of bolt-receiving openings 39, and each of the bars 37 and 38 is provided with an overhanging lug 41 cooperating with the angular portion 32 of the plate 31 to provide a socket receiving the frame bar 15. A short sleeve 43 (Fig. 6) is secured, as by welding, to the end portion of the plate 31 adjacent the bar 37 and in alignment with an opening 44 formed in the plate 31. The sleeve 43 is reenforced by a bracing gusset 45, also welded in position.

The other member 27 of the hitch structure 25 preferably takes the form of a strap member 47 shaped, as best shown in Figure 7, to provide an arcuate section 48 having a plurality of apertures 49, and a lug section 51, the sections 48 and 51 being rigidly interconnected by a generally diagonally extending angle member 52 securely welded or otherwise fixed at one end to the end of the arcuate section 48 and securely welded or otherwise fixed at its other end to the lug 51 and the associated portion of the strap member 47. This end of the angle member 52 is flattened and is apertured to receive a generally L-shaped pin member 53, one portion of which is secured, as by welding, to the flattened end of the angle 52 and the other portion of which is bent laterally outwardly and secured, as by welding, to an angle bracket 54, which is also welded to the strap member 47. The laterally outer end of the L-shaped pin 53 is reduced in diameter, as indicated at 55, to receive the ball connector of the left-hand lower tension link 13 of the tractor. At the other side of the hitch member 27, the strap member 47 is provided with a depending angular bracket 56 that is securely welded to the member 47 adjacent the juncture of the arcuate section 48 with the main portion of the member 47. The bracket 56 receives a short pin 57 that is also reduced in diameter at its outer end and adapted thereby to receive the ball connector of the left-hand tension link 13.

Also forming a part of the forward hitch frame member 27 is a vertically extending mast section 60. As best shown in Figure 1, this part of the draft frame 25 comprises a plate member bent into generally U formation, thereby providing right- and left-hand side plate sections 61 and 62 suitably spaced apart to receive therebetween the ball connector at the rear end of the upper or compression link 12. To this end, the upper portions of the plate sections 61 and 62 are apertured to receive a pivot pin 63 by which the rear end of the link 12 is swingably connected with the mast 60. The latter unit also includes a lower strap section 65 having its forward end portion turned downwardly, as at 66, and apertured to receive a pair of attaching bolts 67 by which the downturned portion 66 may be securely fixed to the central portion of the strap member 47. The mast 60 is rigidly connected with the diagonal angle member 52, and to this end, the latter member carries a centrally disposed angle clip 68 that is welded to the angle brace 52 and apertured to receive an attaching bolt 69 that extends upwardly from the clip 68 into an aperture 71 formed in the rear end of the strap member 65. Adjacent the opening 71, the central portion of the mast member 60 is notched, as at 72, to provide access to the clamping bolt 69. The triangular plate member 31 is provided with a slot 74 that is arcuate about the axis of the sleeve 43, whereby the rear frame member 26 may be shifted into different angular positions relative to the forward or mast-carrying frame member 27. By virtue of the plurality of openings 49 in the arcuate section 48, the two frame members 26 and 27 may be connected together in various selected angular relations by the simple expedient of loosening and removing the two bolts 40 that extend through the openings 39 in the arcuate frame section 38 and disposing them in selected openings 49 of the arcuate section 48. By virtue of this arrangement, the disk gangs may be adjusted in five-degree steps from a position making thirty-five degrees with respect to the transverse axis passing through the pins 55 and 57 to a position making fifty degrees with respect to said transverse axis. Thus, the working angle of the disk gang may be adjusted as desired or necessary to meet practically any soil condition.

As mentioned above, the draft links 12 and 13 of the tractor 11 are capable, not only of swinging vertically relative to the tractor, but also swinging laterally, and since an angularly disposed gang of disks is subjected to considerable side thrusts when in operation, some means should be provided to prevent the disk gang from swinging laterally out of the proper trailing position. To this end, the present invention contemplates the provision of a side-thrust-resisting colter attachment, which will now be described.

The colter attachment of the present invention is indicated in its entirety by the reference numeral 80 and, as best shown in Figure 1, is adapted to be connected to the frame bar 15 at one side of the draft structure described above and generally adjacent one end of the bar 15.

The colter attachment unit 80 includes an attachment frame 81 made up of a generally triangular plate 82 and an encircling strap member 83 welded to the edges of the plate 82. The latter member includes an angled section 84 shaped to fit snugly against the forward and lower sides of the bar 15. The rear end of the encircling strap member 83 is extended, as at 85, to form lugs overhanging the upper side of the square bar, when the unit 80 is attached to the implement. The plate 82 is notched, as at 86, and apertured, as at 87, to receive clamping means 88 by which the frame 81 may be securely fixed to the bar 15. Like the unit 25, by loosening the associated clamping means, the colter attachment may be shifted to different positions along the bar 15. The frame 81 also includes a vertically disposed sleeve member 91 securely welded to the plate 82 and the encircling strap member 83 with a portion of the sleeve 91 extending above the plane of the strap 83.

A ground-engaging, side-thrust-resisting colter disk 95 is journaled for rotation on the transversely extending wheel spindle 96 that is fixed to the lower end of a sleeve member 97 that, with the spindle 96, forms the colter axle. The sleeve member 97 is dimensioned to fit snugly but movably within the attachment frame sleeve 91 and is capable of both rotational and axial movement therein. The upper end of the axle sleeve 97 is provided with diametrically aligned openings 98 in which a nut member 99 is disposed. The nut member 99 is provided with a central screw-threaded aperture 101 that is thereby adapted to receive a lower threaded end 102 of an adjusting crank 103.

A guide member 105 is disposed within the inner sleeve 97 and comprises an elongated member having a generally vertically extending slot 106 therein extending from a point near the lower end of the member 105 to a point adjacent the upper end thereof. The slot 106 is dimensioned to slidingly receive the nut member 99. The upper end of the guide member 105 is formed with a flanged head section 108 that overlies the upper end of the attachment frame sleeve 91, and the head 108 is extended, as at 109, and provided with a boss section 110 having spheroidal abutment ends 111. The upper end or head portion of the guide member 105 is formed with a cylindrical recess 112 that receives abutment means associated with the adjusting crank 103, to which reference will be made later.

A cap member 115 is carried by the attachment frame 81 and comprises a part having an upper wall 116 and an encircling side wall 117, and from opposite side wall portions a pair of laterally inwardly extending lugs 118 are extended. These portions are apertured, as at 119, to provide means receiving a pair of cap screws 121 by which the cap member 115 may readily be securely fixed to the attachment frame 81 so as to form a part thereof. The side wall 117 of the cap member 115 is provided with opposite transversely apertured bosses 125, the apertures 126 of which are generally in alignment and threaded to receive adjusting screws 127. The parts are so shaped that when the cap member 115 is disposed in position, the inner ends of the adjusting screws 127 are in a position to engage and be locked against the spheroidal ends 111 of the guide member lug 110. By loosening one of the adjusting screws 127 and tightening the other, the guide member may be rotated within the sleeves 91 and 97, and since the slot 106 in the guide member 105 snugly receives the nut member 99, which latter member has ends entering the opening 98 in the inner sleeve 97, the locking or adjusting screws 127 form means whereby the guide member 105 may be rotated to rotate the axle means of the colter about a generally vertical axis, thus changing the position of the vertical plane in which the colter disk 95 rotates, relative to the attachment frame and, of course, relative to the associated disk gang. The parts are so arranged that the guide member 105 may be shifted about fifteen degrees through the use of the adjusting screws 127. It will be understood that for most operations the colter disk should be arranged so that its plane of operation extends generally in the direction of travel, with a slight toe-in and, therefore, whenever the disk gang and its draft frame member is adjusted relative to the forward draft frame member, which is attached to the tractor linkage, so as to vary the angle of the disk gangs, a corresponding adjustment will be made in the position of the colter disk relative to the colter attachment frame. Experience has shown that the trailing characteristics of an implement of this kind are quite sensitive to changes in the lead of the colter disk, and the use of set screws or adjusting screws 127 makes it possible to provide very fine adjustment of the colter disk or blade.

The adjusting crank screw 103 is used for raising and lowering the colter disk and its axle means relative to the attachment frame. To this end, the upper portion of the adjusting crank 103 is apertured, as at 131, and receives a cross pin 132 on which a pair of abutment rollers 133 are disposed. These parts are so shaped that they serve as bearing means acting between the underside of the upper wall 116 of the cap member 115 and the bottom of the recess 112 in the upper end of the guide 105 so as to carry the loads imposed by the weight of the implement and associated parts, or at least that portion thereof that acts to force the colter disk 95 into the ground to the depth desired, the depth being varied by turning the crank 103 in one direction or the other so as to shift the colter sleeve 97 upwardly or downwardly within the attachment frame sleeve 91. At all times, of course, the plane of operation of the colter disk is maintained by the adjusting cap screws 127 and the associated guide member 105 in which the colter raising and lowering nut member 99 is disposed.

When it is desired to operate with the tiller close to the trunks of trees, vines and the like and to throw dirt away therefrom, it is preferable to have the colter disk disposed on the inside of the attachment frame sleeve 91, rather than on the outside as shown in Figure 1. This may readily be arranged, according to the principles of the present invention, merely by, first, removing the attachment frame cap 115, and then taking out the nut member 99, turning the colter axle sleeve 105 through 180 degrees and then reassembling the parts, bringing them to the position shown generally in Figure 5. As shown in this figure, also, the attachment frame clamps 88 may be loosened and the attachment frame 81 shifted to the end of the frame bar 15 so as to act as a bumper to keep the outermost disk from damaging the trees, vines and the like. It will also be noted, particularly from Figure 4, that the end of the slot 106 limits the axial movement of the nut member 99, the length of the threaded portion 102 of the crank 103 being sufficient to prevent disengagement of the parts when the crank 103 is operated to shift the nut member from one end to the other of the slot 106.

It will also be noted that by loosening the clamps 36, the disk gang and its frame bar 15 may be shifted in either direction with respect to the hitch 25 to accommodate a variety of tractor treads and maintain a proper cut with the front or first disk. For throwing the soil up to the vines, trees or the like, the front disk can be moved close to the right wheel of the tractor, in which position it is capable of throwing soil beyond the wheel, and for pulling the soil away from the vines, trees and the like, the disk gang is shifted in the opposite direction so as to bring the rear disk beyond the left tractor wheel, thus permitting cultivation close to the plants. Also, as mentioned above, in this position, it may be desirable to reverse the colter so that the colter disk is on the inside, rather than outside, of the attachment frame sleeve 91, as shown in Figure 5.

While we have shown and described above the preferred structure in which the principles of the present invention have been incorporated, it is to be understood that our invention is not to be limited to the particular means shown and described above, but that, in fact, widely different means may be employed in the practice of the broader aspects of our invention.

What we claim, therefore, and desire to secure by Letters Patent is:

1. A colter attachment for an agricultural implement or the like, comprising an attachment frame, a vertically disposable sleeve fixed thereto, a colter axle comprising a generally vertically disposable elongated member, said member being disposed within said sleeve and including an upper tubular section, a guide disposed within said tubular section, means acting between said attachment frame and said guide for shifting the position of the latter generally about the axis of said sleeve, means providing a telescopic non-rotatable connection between said tubular section and said guide, and means acting between said guide and said elongated member for raising and lowering the latter within said sleeve.

2. A colter attachment for an agricultural implement or the like, comprising an attachment frame, a vertically disposable sleeve fixed thereto, a colter axle comprising an elongated member disposable within said sleeve and a disk-receiving spindle extending transversely of said member adjacent the lower end thereof, said elongated member including an upper tubular section, a generally vertically disposed guide member disposed within said tubular section and fixedly connected with said frame, said guide having a vertically extending slot therein, means carried by said tubular section and disposed guidingly in said slot, means for rotating said guide member so as to rotate said elongated member, and means acting between said frame and said elongated member for raising and lowering the latter within said sleeve relative to said frame.

3. In an agricultural machine, a frame, a pair of telescopically associated sleeves, the outer sleeve being fixed to said frame and the inner sleeve being shiftable axially of the outer sleeve, a part carried by the inner sleeve and extending generally transversely of the latter, a guide member having a longitudinal slot receiving said part and disposed within said inner sleeve, and adjusting means fixedly connecting said guide member with said frame, said adjusting means acting against said frame to shift said guide member and said inner sleeve about the axis of said sleeves.

4. The invention set forth in claim 3, further characterized by said part comprising a nut member, and a crank screw acting between said frame and said nut member for raising and lowering the inner of said sleeves.

5. In an agricultural machine or the like, frame means, a generally vertical sleeve fixed at its upper portion to said frame means, a generally vertically shiftable member disposed within said sleeve and carrying a nut member, a screw-threaded crank member having a screw-threaded connection with said nut member, a cap member detachably fixed to said frame in embracing relation with respect to the upper end of said sleeve, abutment means carried by said crank member and engaging an interior surface of said cap member to prevent upward displacement of said crank member, rotation of the latter in one direction acting against said cap member for forcing said nut member and said vertically shiftable member downwardly relative to said sleeve and said frame, a guide member having sliding diametrically reversible connection with said vertically shiftable member and said nut member and disposed within said sleeve, and means carried by said cap member for holding said guide member in selected positions of adjustment, said guide member and said vertically shiftable member being movable outwardly from the upper end of said sleeve member when said cap member is removed, thereby providing for removal of said nut member and reinstallation thereof after said vertically shiftable member has been moved through 180 degrees about the axis of said sleeve member.

6. A colter attachment for an agricultural implement or the like, comprising an attachment frame, a vertically disposable sleeve fixed thereto, a colter axle comprising a generally vertically disposable elongated member, said member being disposed within said sleeve and including an upper tubular section, a guide disposed within said tubular section, means acting between said attachment frame and said guide for shifting the position of the latter generally about the axis of said sleeve, and means providing a telescopic non-rotatable connection between said tubular section and said guide.

References Cited in the file of this patent
UNITED STATES PATENTS

| | | |
|---|---|---|
| 608,696 | Matteson | Aug. 9, 1898 |
| 773,610 | Wagner | Nov. 1, 1904 |
| 1,035,039 | Paul | Aug. 6, 1912 |
| 1,119,624 | Milliken | Dec. 1, 1914 |
| 1,368,733 | Koontz | Feb. 15, 1921 |
| 1,472,768 | Dickinson | Oct. 30, 1923 |
| 1,509,310 | Paul | Sept. 23, 1924 |
| 2,244,774 | Hewitt | June 10, 1941 |
| 2,523,152 | Seyferth | Sept. 19, 1950 |
| 2,539,897 | Davey et al. | Jan. 30, 1951 |